United States Patent
Ryu et al.

(10) Patent No.: US 8,553,171 B2
(45) Date of Patent: Oct. 8, 2013

(54) DISPLAY DEVICE

(75) Inventors: Ho-Han Ryu, Suwon-si (KR);
Cheol-Yong Noh, Asan-si (KR);
Tae-Seok Kim, Suwon-si (KR);
Myoung-Gyun An, Asan-si (KR)

(73) Assignee: Samsung Display Co., Ltd. (KR)

( * ) Notice: Subject to any disclaimer, the term of this patent is extended or adjusted under 35 U.S.C. 154(b) by 1022 days.

(21) Appl. No.: 12/582,719

(22) Filed: Oct. 21, 2009

(65) Prior Publication Data
US 2010/0177124 A1    Jul. 15, 2010

(30) Foreign Application Priority Data
Jan. 9, 2009   (KR) .......................... 10-2009-0002000

(51) Int. Cl.
*G02F 1/1333* (2006.01)
*G02F 1/1335* (2006.01)
*F21V 7/04* (2006.01)

(52) U.S. Cl.
USPC ............... 349/58; 349/61; 362/632; 362/633; 362/634

(58) Field of Classification Search
USPC ................................ 349/58, 61; 362/632–634
See application file for complete search history.

(56) References Cited

U.S. PATENT DOCUMENTS

| | | | |
|---|---|---|---|
| 2007/0008449 A1* | 1/2007 | Choi | 349/58 |
| 2007/0013827 A1* | 1/2007 | Fang | 349/58 |
| 2008/0170170 A1* | 7/2008 | Jung et al. | 349/58 |

* cited by examiner

*Primary Examiner* — Nathanael R Briggs
(74) *Attorney, Agent, or Firm* — Cantor Colburn LLP

(57) ABSTRACT

The display device includes a display panel displaying images, a light source generating and supplying light to the display panel, and a unitary indivisible frame supporting the display panel and including the light source disposed therein. The frame includes a bottom surface, a plurality of sidewalls which each extend from the bottom surface, a plurality of seating portions which extend from the plurality of sidewalls and on which the display panel is seated, and support protrusions protruding inclined from the seating portions and facing a lateral surface of the display panel. The bottom surface, the plurality of sidewalls, the plurality of seating portions and the support protrusions are disposed continuous with each other in the unitary indivisible frame.

21 Claims, 11 Drawing Sheets

DISPLAY DEVICE

This application claims priority to Korean Patent Application No. 10-2009-0002000 filed on Jan. 9, 2009, and all the benefits accruing therefrom under 35 U.S.C. §119, the disclosure of which is incorporated herein by reference in its entirety.

BACKGROUND OF THE INVENTION

1. Field of the Invention

The present invention relates to a display device, and more particularly, to a display device which can achieve thinness and a slim profile and can be easily manufactured by providing a simplified frame in which a display panel is seated and optical sheets are accommodated.

2. Description of the Related Art

As the modern society changes into an information-oriented society, market demand for display apparatuses having a large-screen size and a slim profile is increasing. To overcome the disadvantages of the conventional cathode ray tubes ("CRTs"), there is an explosively growing demand for flat display devices ("FPDs") represented by a plasma display panel ("PDP") device, a plasma address liquid crystal ("PALC") display panel device, a liquid crystal display ("LCD") device, an organic light emitting diode ("OLED") device, and so on.

Specifically, flat-panel display devices have some notable advantages, such as relatively small size, light weight, low power consumption and so on. Due to such advantages, the FPDs are used in a wide variety of applications such as, in the computer industry, the electronic industry, the information telecommunication industry, and the like. The flat-panel display device includes a liquid crystal panel assembly including a liquid crystal panel displaying image information, a backlight assembly including a light source such as a lamp for emitting light and a light guiding plate for guiding light toward the liquid crystal panel, and a receiving container receiving the liquid crystal panel and the backlight assembly.

In particular, research to reduce the overall thickness and/or weight of the display device is actively carried out by reducing the volume occupied by a frame and a receiving container forming the external appearance (e.g., surfaces) of the display device. Here, it is necessary to maintain the structural strength while reducing the overall thickness and/or weight of the display device.

Meanwhile, dark areas may be perceived from the display panel according to the arrangement of a frame and optical sheets. Accordingly, a frame without a dark area is desired.

BRIEF SUMMARY OF THE INVENTION

An exemplary embodiment provides a display device which can achieve thinness and a slim profile and can be easily manufactured by providing a simplified frame in which a display panel is seated and optical sheets are accommodated.

In an exemplary embodiment of the present invention, there is provided a display device including a display panel displaying images, a light source supplying light to the display panel, and a unitary indivisible frame supporting the display panel and including the light source disposed therein. The frame includes a bottom surface, a plurality of sidewalls which extend from the bottom surface, and a plurality of seating portions which extend from the plurality of sidewalls and in which the display panel is seated. The bottom surface, the plurality of sidewalls and the plurality of seating portions are integrally formed and disposed continuous with each other in the unitary indivisible frame.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
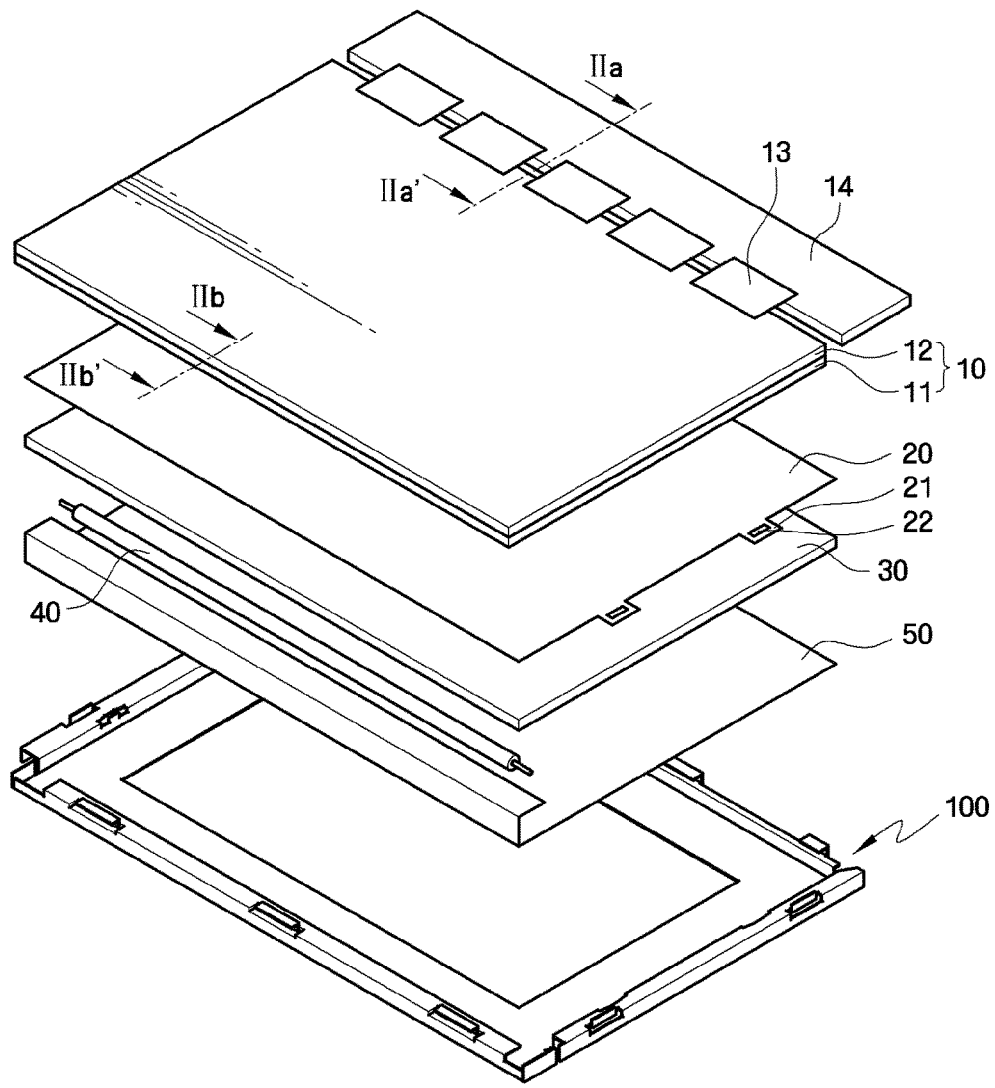
FIG. 1 is an exploded perspective view of a first exemplary embodiment of a display device according to the present invention.

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification. In the drawings, the size and relative sizes of layers and regions may be exaggerated for clarity.

It will be understood that when an element or layer is referred to as being "on", "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "below", "lower", "under," "above", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "lower" relative to other elements or features would then be oriented "above" relative to the other elements or features.

Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the present invention will be described in detail with reference to the accompanying drawings.

Figure 2A:
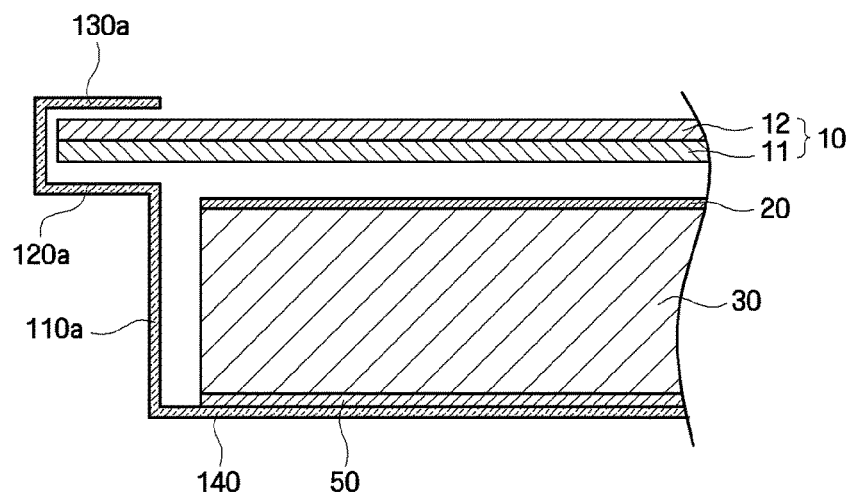
FIG. 2A is a cross-sectional view of the display device taken along line IIa-IIa' of FIG. 1.
Figure 2B:
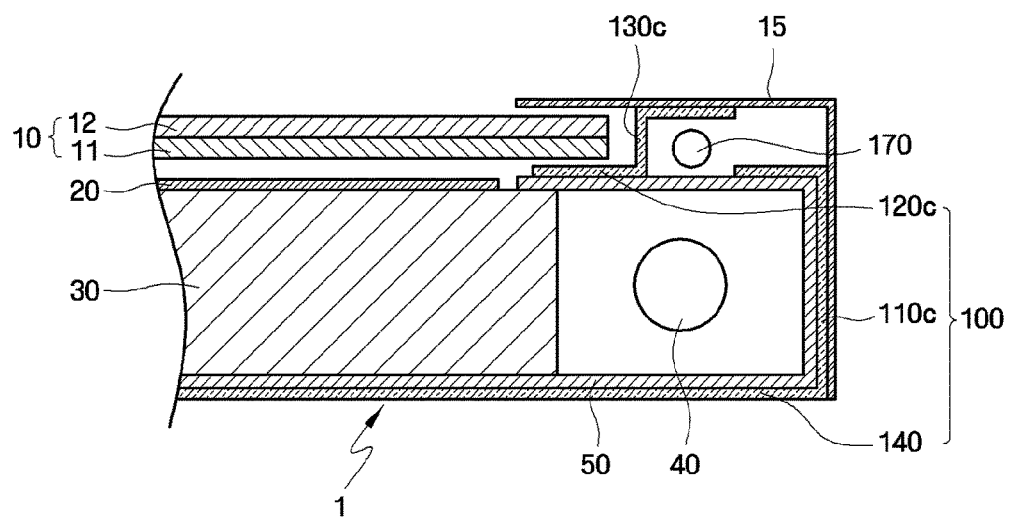
FIG. 2B is a cross-sectional view of the display device taken along line IIb-IIb' of FIG. 1.

Hereinafter, a first exemplary embodiment of a display device 1 according to the present invention will be described in detail with reference to FIGS. 1 through 8. The display device 1 will be described with reference to FIGS. 1 through 2B. FIG. 1 is an exploded perspective view of a first exemplary embodiment of a display device according to the present invention, FIG. 2A is a cross-sectional view of the display device taken along line IIa-IIa' of FIG. 1, and FIG. 2B is a cross-sectional view of the display device taken along line IIb-IIb' of FIG. 1.

The display device 1 includes a display panel assembly and a backlight assembly. The display panel assembly includes a display panel 10 including a lower substrate 11 and an upper substrate 12, a liquid crystal (not shown), a flexible printed circuit board 13, and a printed circuit board 14.

The flexible printed circuit board 13 is connected to each of a plurality of a gate line (not shown) or a plurality of a data line (not shown) disposed on the lower substrate 11. In an exemplary embodiment, the flexible printed circuit board 13 may include wiring patterns such that semiconductor chips are disposed on a base, and a TAB tape is bonded by a tape automated bonding ("TAB") technique. Such chip film packages may include, but are not limited to, a tape carrier package ("TCP"), a chip on film ("COF"), and the like. However, the above-referenced chip film packages are provided for illustration only, and the present invention is not limited thereto.

Various driving components for supplying the gate lines and the data lines with a gate driving signal and a data driving signal through the flexible printed circuit board 13, respectively, may be mounted on the printed circuit board 14.

The backlight assembly includes an optical sheet 20, a light guide plate 30, a light source 40, a reflection sheet 50 and a frame 100.

The light source 40 may include one or more lamps for generating and emitting light. Exemplary embodiments of the light source 40 include, but are not limited to, a line light source such as a cold cathode fluorescent lamp ("CCFL"), a hot cathode fluorescent lamp ("HCFL"), an external electrode fluorescent lamp ("EEFL"), and a point light source such as a light emitting diode ("LED"). As shown in FIG. 1, in an edge-type backlight assembly, at least one light source 40 may be positioned a side of the light guide plate 30. The light source 40 may be disposed at only one incident side of the light guide plate 30 (as illustrated in FIG. 1), or may be disposed at both of opposing incident sides of the light guide plate 30.

The light guide plate 30 guides the light supplied from the light source 40 to the display panel 10. In an exemplary embodiment, the light guide plate 30 may include a plastic panel made of a transparent material, such as polymethyl methacrylate (PMMA), etc. The light guide plate 30 is configured to transmit the light generated and emitted from the light source 40 which is incident on incident surfaces of the light guide plate 30, to travel toward the display panel 30 positioned over (e.g., overlapping in a plan view of the display device 1) the light guide plate 30. In an exemplary embodiment, various patterns for switching a traveling direction of the light incident into the light guide plate 30 to the display panel 30 may be printed on a bottom surface of the light guide plate 30, which is opposite to the display panel 10 with respect to the light guide plate 30.

The optical sheet 20, which is disposed on the light guide plate 30, diffuses and concentrates light emitted from the light guide plate 30 towards the display panel 10. The optical sheet 20 may include a diffusion sheet, a prism sheet and/or a protective sheet. Alternatively, the optical sheet 20 may be a single, unitary, indivisible and continuous sheet, such as a combination sheet having all functions of the individual diffusion, prism and protective sheets. In one exemplary embodiment, the combination sheet may be constructed such that it has a diffusion capability at its bottom layer, a prism pattern (not shown) is disposed on the bottom layer, and a protective layer disposed on the prism pattern. In such a manner, since the combination optical sheet 20 encompasses all of diffusive and prismatic functions in a single and continuous sheet, the number of components of the backlight assembly can be reduced, advantageously making the display device 1 relatively slimmer.

The frame 100 accommodates the optical sheet 20, the light guide plate 30, and the light source 40, and the display panel 10 is disposed thereon. The frame 100 has a window (e.g., opening) disposed in a center area, to allow for transmittance of the light having passed through the light guide plate 30 and the optical sheet 20. The frame 100 includes sidewalls 110a, 110b, 110c and 110d disposed longitudinally extending along a rectangular perimeter of the frame 100 to surround at least outer side surfaces of the light guide plate 30 and the light source 40. The sidewalls 110a and 110c are longitudinally extended substantially parallel with each other, and the sidewalls 110b and 110d are longitudinally extended substantially parallel with each other. The sidewall 110c is disposed adjacent to the light source 40, while the sidewalls 110b and 110d are disposed directly adjacent to the sidewall 110c. The sidewall 100a is disposed opposing the sidewall 110c with respect to the light guide plate 30.

The frame 100 includes a bottom surface 140 extending from each of the sidewalls 110a, 110b, 110c and 110d towards the light guide plate 30, and disposed continuous with each of the sidewalls 110a, 110b, 110c and 110d. The sidewalls 110a, 110b, 110c and 110d may be disposed substantially perpendicular to a plane of the bottom surface 140 and extend towards the display panel 10. An upper surface of the bottom surface 140 of the frame 100 directly contacts a bottom surface of the light guide plate 30. The bottom surface 140 may include an opening disposed a center portion and overlap a perimeter (e.g., defined by outer edges) of the light guide plate 30, as shown in FIG. 1. In an alternative embodiment, the opening of the bottom surface 140 may be disposed to overlap substantially an entire of the bottom surface of the light guide plate 30.

Referring to FIGS. 2A and 2B, seating portions 120a, 120b, 120c and 120d, which inwardly or outwardly extend from a respective one of the sidewalls 110a, 110b, 110c and 110d, may be disposed overlapping the light guide plate 30 and/or the display panel 10. The seating portions 120a, 120b, 120c and 120d define a seating plane to provide a surface upon which the display panel 10 is disposed, such as being disposed directly adjacent to and/or contacting the seating portions 120a, 120b, 120c and 120d. The seating portions 120a, 120b, 120c and 120d may extend from the sidewalls 110a, 110b, 110c and 110d and may serve as a light source cover as well.

The frame 100 may be integrally disposed with the bottom surface 140, the sidewalls 110a, 110b, 110c and 110d and the seating portions 120a, 120b, 120c and 120d. The bottom surface 140, the sidewalls 110a, 110b, 110c and 110d and the seating portions 120a, 120b, 120c and 120d are each disposed continuous with each other, and collectively define a single, unitary, continuous and indivisible member of the frame 100. In one exemplary embodiment, the frame 100 may be formed by pressing, which will later be described in detail.

The frame 100 may be combined with the display panel 10 by a combining member, such as an adhesive member 15. Referring to FIG. 2B, the adhesive member 15 may be used to adhesively couple at least one of the seating portions 120a, 120b, 120c and 120d and the sidewalls 110a, 110b, 110c and 110d to the display panel 10. In an exemplary embodiment, the adhesive member 15 may be an adhesive tape capable of shielding light.

The reflection sheet 50 is disposed below the light guide plate 30 to reflect light passing downward through the bottom surface of the light guide plate 30 upwards from the light guide plate 30 to the display panel 10. The reflection sheet 50 is disposed directly between the lower surface of the light guide plate 30 and the upper surface of the bottom surface 140 of the frame 100. The reflection sheet 50 is a single, unitary, indivisible and continuous member, and overlaps substantially an entire portion of the lower surface of the light guide plate 30. The reflection sheet 50, which is disposed below the light guide plate 30, further reflects unreflected light, e.g., the light which is not reflected by fine dot patterns disposed on the rear surface of the light guide plate 30, toward to an exit face of the light guide plate 30, thereby reducing loss of light incident into the display panel 10 and enhancing uniformity of light transmitted to the exit face of the light guiding plate 30.

Figure 3:
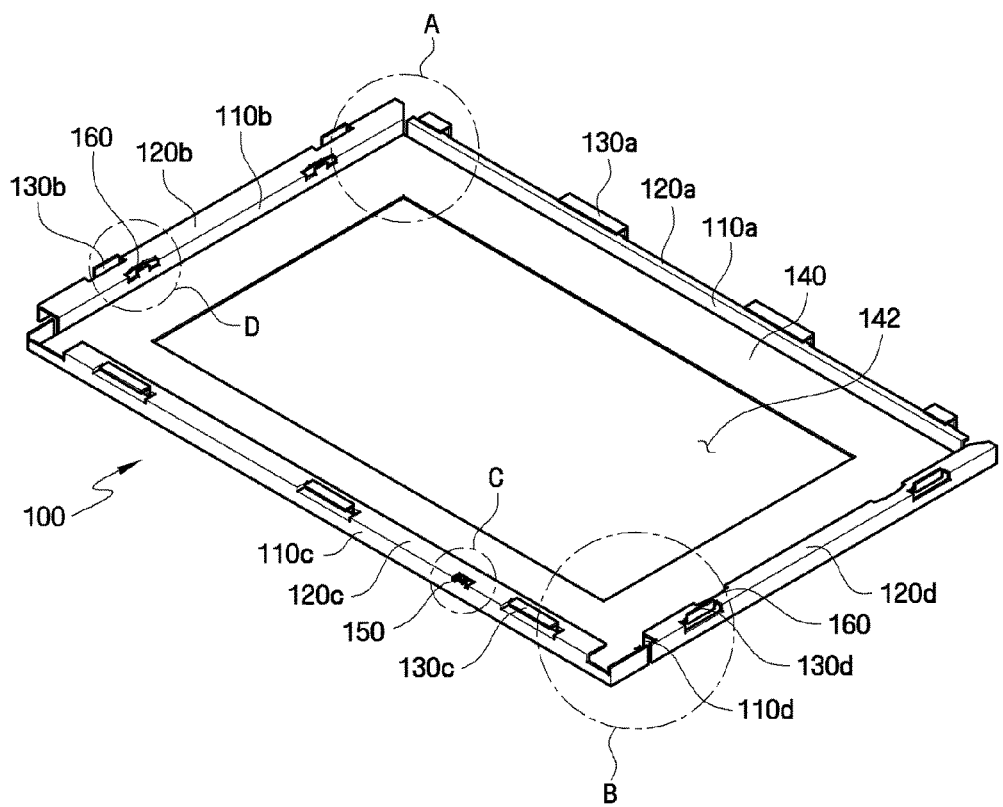
FIG. 3 is a perspective view of an exemplary embodiment of a frame included in the display device shown in FIG. 1.
Figure 4A:
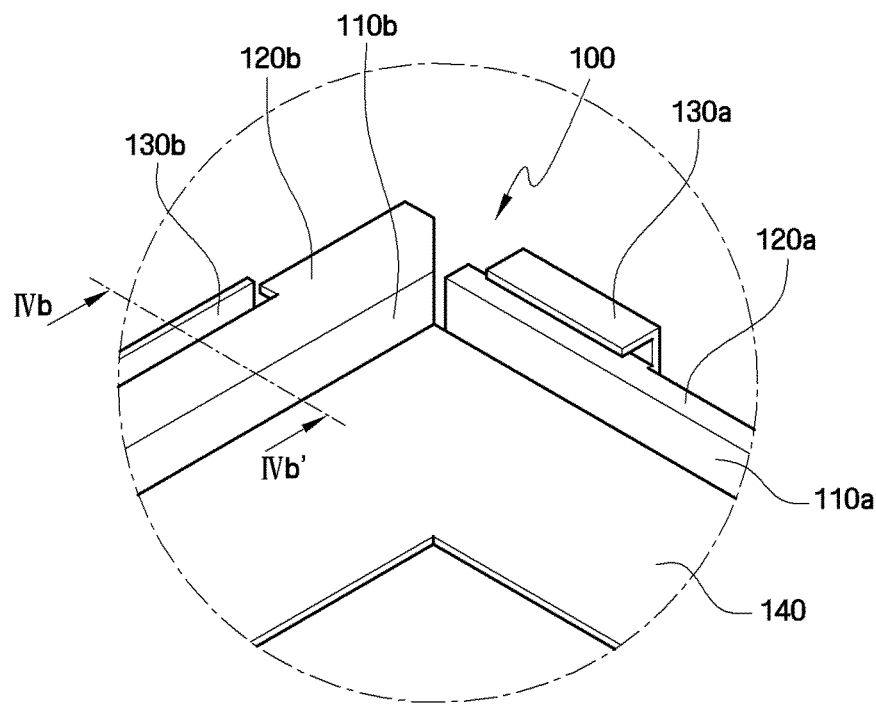
FIG. 4A is an enlarged view of a portion "A" of the frame shown in FIG. 3.
Figure 4B:
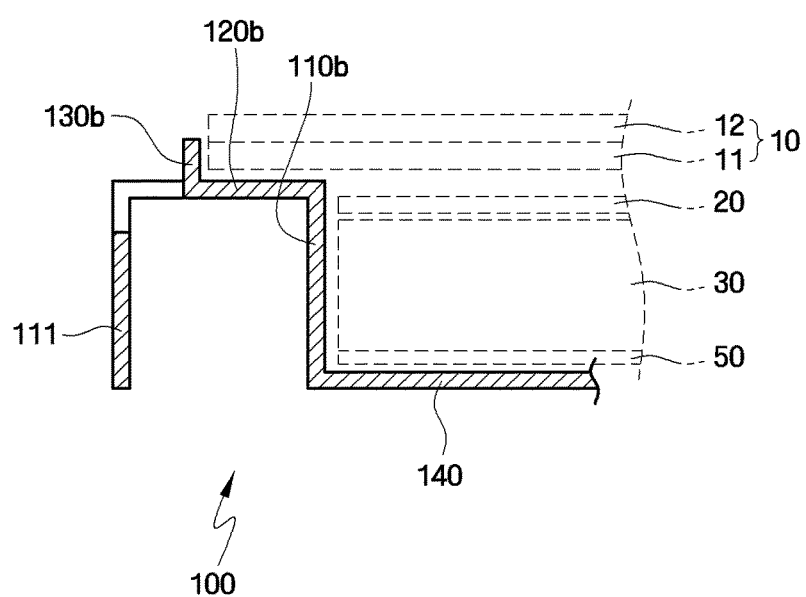
FIG. 4B is a cross-sectional view of the frame taken along line IVb-IVb' of FIG. 4A.
Figure 5A:
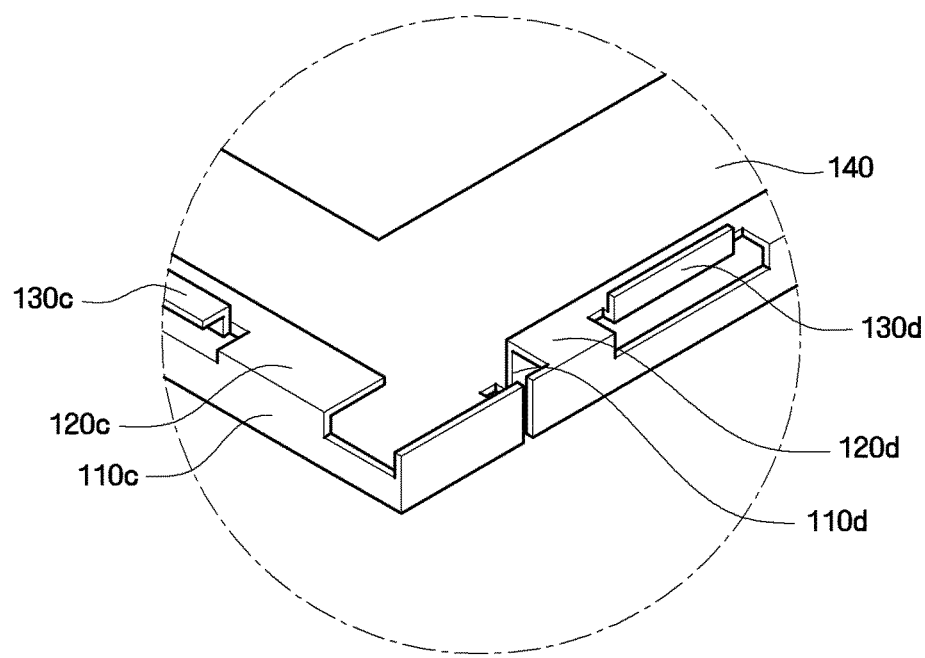
FIG. 5A is an enlarged view of a portion "B" of the frame shown in FIG. 3.
Figure 5B:
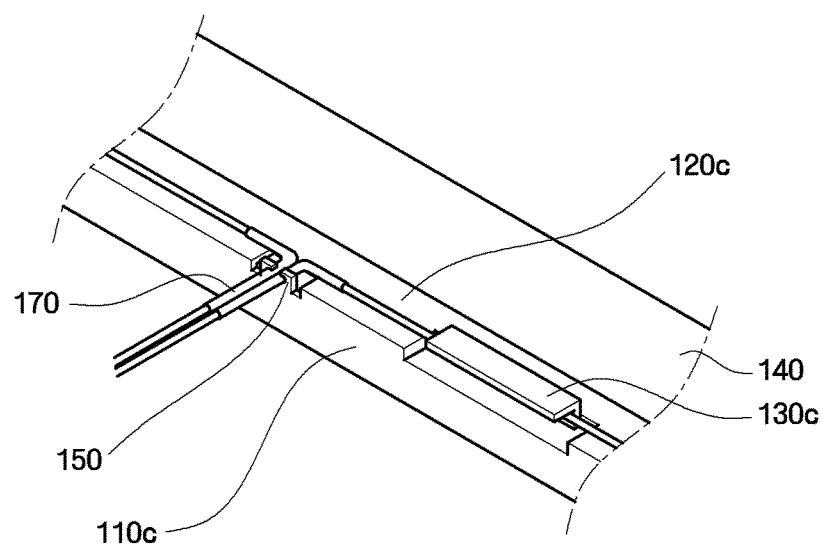
FIG. 5B is a partially perspective view illustrating an exemplary embodiment of a state in which the frame shown in FIG. 3 is connected to an electric wire.
Figure 6:
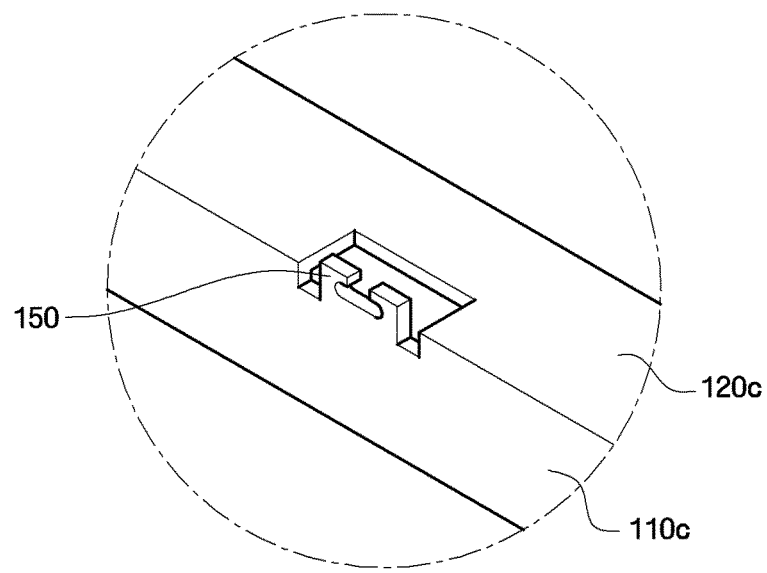
FIG. 6 is an enlarged view of a portion "C" of the frame shown in FIG. 3.
Figure 7A:
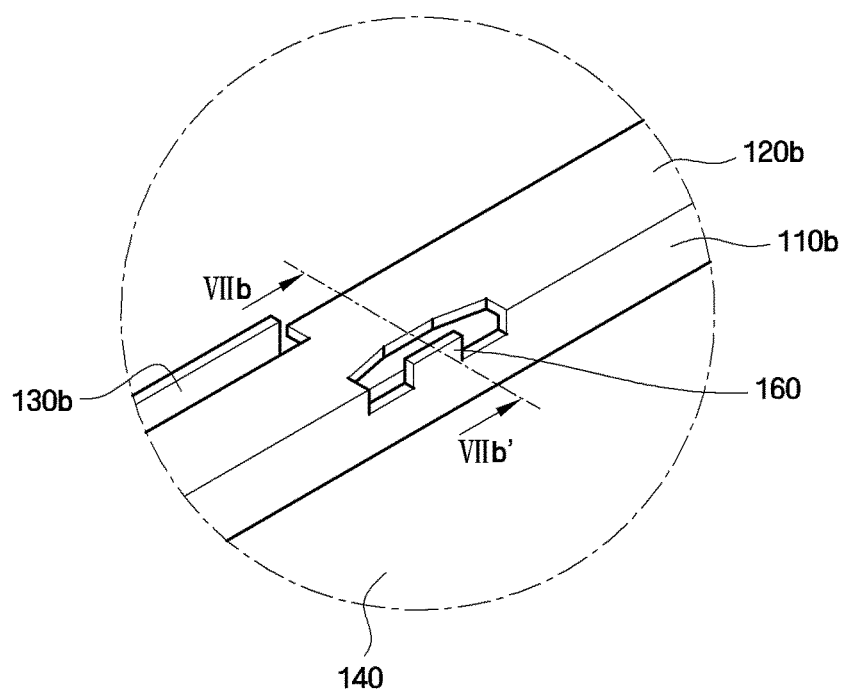
FIG. 7A is an enlarged view of a portion "D" of the frame shown in FIG. 3.
Figure 7B:
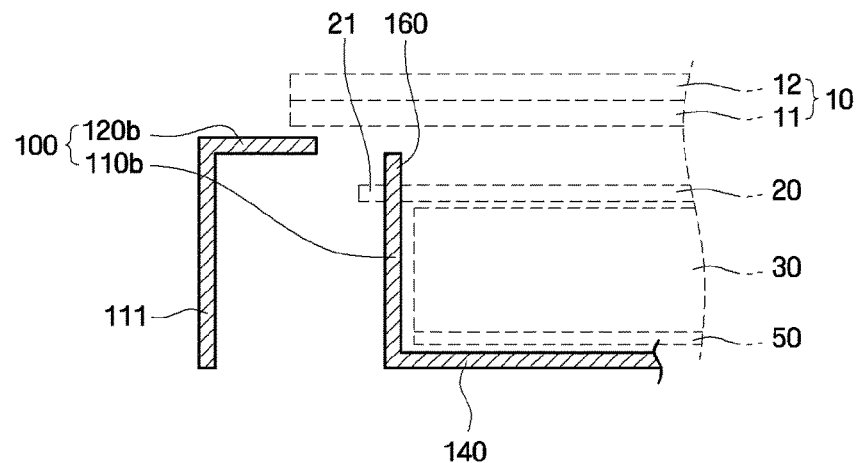
FIG. 7B is a cross-sectional view of the frame taken along line VIIb-VIIb of FIG. 7A.

Hereinafter, an exemplary embodiment of a frame will be described in detail with reference to FIGS. 2A through 7B. FIG. 3 is a perspective view of an exemplary embodiment of a frame included in the display device shown in FIG. 1, FIG. 4A is an enlarged view of a portion "A" of the frame shown in FIG. 3, FIG. 4B is a cross-sectional view of the frame taken along line IVb-IVb' of FIG. 4A, FIG. 5A is an enlarged view of a portion "B" of the frame shown in FIG. 3, FIG. 5B is a partially perspective view illustrating an exemplary embodiment of a state in which the frame shown in FIG. 3 is connected to an electric wire, FIG. 6 is an enlarged view of a portion "C" of the frame shown in FIG. 3, FIG. 7A is an enlarged view of a portion "D" of the frame shown in FIG. 3, and FIG. 7B is a cross-sectional view of the frame taken along line VIIb-VIIb' of FIG. 7A.

The display panel 10 is seated on the frame 100, and the optical sheet 20, the light guide plate 30, the light source 40, and the reflection sheet 50 are accommodated in the frame 100. The frame 100 forms a supportive framework of the display device 1 and protects various components accommodated therein from external impacts.

The frame 100 is preferably formed to have a sufficiently high strength for purposes of protecting various components accommodated therein from external impacts. In one exemplary embodiment, the frame 100 may be formed by pressing a metal plate made of steel use stainless ("SUS"), or brass. As described above, the slim display device 1, while having a sufficient high strength, can be obtained by forming the frame 100 using the metal plate. The forming of the frame 100 is not limited to the illustrated exemplary embodiment. Alternatively, the frame 100 may also be made of polycarbonate ("PC") or a mixture of PC and acrylonitrile butadiene styrene ("ABS") copolymer resin by injection processing.

Referring to FIG. 3, the frame 100 includes four sidewalls 110a, 110b, 110c and 110d collectively forming a substantially rectangle. A seating portion 120a, 120b, 120c, 120d, which inwardly extends from a respective sidewall 110a, 110b, 110c, 110d and on which the display panel 10 is seated, may be disposed on at least one of the sidewalls 110a, 110b, 110c and 110d. As used herein, inwardly indicates towards a center area of the frame 100, such as towards the light guide plate 30 from the sidewalls 110a, 110b, 110c, 110d.

The four sidewalls 110a, 110b, 110c and 110d defining the rectangular shape of the frame 100 are referred to as first to fourth sidewalls 110a, 110b, 110c and 110d, respectively, and the seating portions 120a, 120b, 120c and 120d extending from the respective sidewalls 110a, 110b, 110c and 110d are referred to as first to fourth seating portions 120a, 120b, 120c and 120d, respectively.

The first to fourth sidewalls 110a, 110b, 110c and 110d may have a height long enough to accommodate both the light guide plate 30 and the reflection sheet 50 therein. The height is taken in a direction substantially perpendicular to a plane of the bottom surface 140 of the frame 140. The height of the first to fourth sidewalls 110a, 110b, 110c and 110d can be adjusted according to the thickness of the light guide plate 30 used.

In an exemplary embodiment where a plate-type light guide plate is accommodated in a receiving space formed by the first to fourth sidewalls 110a, 110b, 110c and 110d and the bottom surface 140, the first to fourth sidewalls 110a, 110b, 110c and 110d may be substantially a same height with one another. Where a wedge-type light guide plate is accommodated in a receiving space formed by the first to fourth sidewalls 110a, 110b, 110c and 110d and the bottom surface 140, heights of sidewalls adjacent to the light source 40 may be relatively large, while heights of sidewalls disposed opposing the light source 40 with respect to the light guide plate may be relatively small.

The first to fourth seating portions 120a, 120b, 120c and 120d extending from the first to fourth sidewalls 110a, 110b, 110c and 110d, may be disposed at substantially the same height so as to be closely adhered to the display panel 10. A surface produced by allowing the first to fourth sidewalls 110a, 110b, 110c and 110d as including the first to fourth seating portions 120a, 120b, 120c and 120d, to contact the display panel 10 may be the same surface, irrespective of the heights of the first to fourth sidewalls 110a, 110b, 110c and 110d. To define the substantially same surface contacting the display panel 10, surfaces of each of the first to fourth sidewalls 110a, 110b, 110c and 110d as including the first to fourth seating portions 120a, 120b, 120c and 120d, may be disposed substantially coplanar with each other.

The frame 100 includes the bottom surface 140 continuously connected to lower ends of each of the first to fourth sidewalls 110a, 110b, 110c and 110d. Each of the first to fourth sidewalls 110a, 110b, 110c and 110d extend from the bottom surface 140, defining four walls of the frame 100. The bottom surface 140 connects the first to fourth sidewalls 110a, 110b, 110c and 110d to one another to reinforce the strength of the frame 100 while maintaining the supportive framework of the frame 100. The first to fourth sidewalls 110a, 110b, 110c and 110d and the bottom surface 140 provide an internal (e.g., receiving) space to accommodate the light source 40, the light guide plate 30, the optical sheet 20 and the reflection sheet 50 therein.

The bottom surface 140 may be connected to the lower ends of the first to fourth sidewalls 110a, 110b, 110c and 110d and may include an opening 142 at its central area. The opening 142 exposes a portion of the lower surface of the reflection sheet 50. The bottom surface 140 including the opening 142 may include a rectangular brim (e.g., edge) spaced apart at a predetermined distance from each of the first to fourth sidewalls 110a, 110b, 110c and 110d, respectively. As described above, the overall weight of the frame 100 can be reduced while maintaining its structural strength, by disposing the opening 142 on the bottom surface 140 of the frame 100 while the bottom surface 140 connects the first to fourth sidewalls 110a, 110b, 110c and 110d to one another.

Referring to FIGS. 2A and 4A, the first seating portion 120a is disposed continuous with and extended from an end of the sidewall 110a of the frame 100. In one exemplary embodiment, the first seating portion 120a may be formed by bending one end of at least one of the sidewalls, e.g., the first sidewall 110a. The first seating portion 120a may extend from the first sidewall 110a to be bent to an exterior side of (e.g., outwardly from) the first sidewall 110a. The first seating portion 120a may extend from the first sidewall 110a substantially in parallel with a light emitting surface of the light guide plate 30 and the bottom surface 140 of the frame 100. The first seating portion 120a may longitudinally extend substantially in parallel with a lateral side surface of the light guide plate 30 disposed facing the first sidewall 110a of the frame 100. As used herein, outwardly indicates away from a center area of the frame 100, such towards the exterior of the display device 1 from the sidewalls 110a, 110b, 110c, 110d.

Each of first to fourth support protrusions 130a, 130b, 130c and 130d extend from an end of the first to fourth seating portions 120a, 120b, 120c and 120d, respectively. The first to fourth support protrusions 130a, 130b, 130c and 130d may include a first (vertical) portion and/or a second (horizontal) portion. Referring to the cross sectional illustrations, vertical is used to indicate a (first) direction substantially perpendicular to the bottom surface 140 of the frame 100, while horizontal is used to indicate a (second) direction substantially parallel to the bottom surface 140 of the frame 100.

Referring to FIG. 2A and 4A, the first support protrusion 130a may be disposed continuous with and extended from an end of the first seating portion 120a, such as being extended from a top surface of the first seating portion 120a. The first support protrusion 130a supports a lateral side surface of the display panel 10 to reduce or effectively prevent movement of the display panel 10 in the frame 100. The first support protrusion 130a includes a first (vertical) portion overlapping the lateral side surface of the display panel 10, and a second (horizontal) portion overlapping an upper surface of the display panel 10 at outer edges of the display panel 10.

In an exemplary embodiment, the first support protrusion 130a may be formed through a cutting process along the first seating portion 120a, as shown in FIG. 4A. A plurality of the first support protrusion 130a may be disposed at intervals along the first seating portion 120a, to then be spaced apart by a predetermined distance from each other by a predetermined interval in a longitudinal extension direction of the first seating portion 120a.

A height taken in the vertical direction of the first support protrusion 130a may be greater than or equal to a thickness of the display panel 10 taken in the vertical direction. The first support protrusion 130a may include the second portion continuous with and bent from the first portion so as to overlap the first seating portion 120a. The second portion of the first support protrusion 130a may be disposed substantially parallel with the first seating portion 120a. The first support protrusion 130a may be disposed to be inwardly bent towards the center area of the frame 100 and overlap the first seating portion 120a. The first support protrusion 130a may be inwardly bent towards the center area of the frame 100 and may have a substantially L-shaped cross section.

The first support protrusion 130a may be integrally formed with the first sidewall 110a and the first seating portion 120a, and may be formed by bending at least one of the first sidewall 110a and the first seating portion 120a. As illustrated in FIGS. 2A and 4A, the first support protrusion 130a, the first seating portion 120a, the first sidewall 110a and the bottom surface 140 collectively form a portion of a single, unitary, continuous and indivisible unit of the frame 100.

The first support protrusion 130a surrounds one end of the display panel 10 in cooperation with the first seating portion 120a, thereby restricting and effectively preventing the display panel 10 from moving in the (second) horizontal direction. The first support protrusion 130a and the first seating portion 120a collectively overlap each of the lateral side surface, a portion of the light emitting surface and a portion of the lower surface of the light guide plate 30. In addition, the first support protrusion 130a restricts and effectively prevents the display panel 10 from moving upward (e.g., in the (first) vertical direction), thereby preventing the display panel 10 from significantly deviating from the first seating portion 120a.

Referring to FIGS. 4A and 4B, the second seating portion 120b may be disposed continuous with and extended from an end of the second sidewall 110b of the frame 100. In an exemplary embodiment, the second seating portion 120b may be formed by bending one end of at least one of the sidewalls, e.g., the second sidewall 110b. The second seating portion 120b may extend from the second sidewall 110b to be bent to the exterior side of the second sidewall 110b. Alternatively, the second seating portion 120b may be bent to the interior side of the second sidewall 110b to partially overlap the light guide plate 30. The second seating portion 120b may longitudinally extend substantially in parallel with a lateral side surface of the light guide plate 30 disposed facing the second sidewall 110b.

Referring to FIG. 4B, the frame 100 may include an external wall 111 extending from the second seating portion 120b and disposed to be facing and substantially parallel with the second sidewall 110b. The external sidewall 111 maintains the strength of the frame 100 in cooperation with the second sidewall 110b. The external sidewall 111 is integrally formed with (e.g., continuous with) the second seating portion 120b, and may be formed by bending one end of the second seating portion 120b.

The second support protrusion 130b protrudes from a top surface of the second seating portion 120b. The second support protrusion 130b supports a lateral side surface of the display panel 10 to reduce or effectively prevent the display panel 10 from moving in the frame 100. The second support protrusion 130b supports a first side of the display panel 10, and the first support protrusion 130a supports a second side of the display panel 10, which is adjacent to the first side supported by the second support protrusion 130b, thereby restricting or effectively preventing the display panel 10 from moving in the horizontal direction.

The second support protrusion 130b may be disposed such that is protrudes from a surface (e.g., past a plane) of the second seating portion 120b. In an exemplary embodiment, the second support protrusion 130b may be formed by bending at least one of the second seating portion 120b, the second sidewall 110b and the external sidewall 111. As illustrated in FIGS. 4B, the second support protrusion 130b, the second seating portion 120b, the second sidewall 110b, the external sidewall 111 and the bottom surface 140 collectively form a portion of a single, unitary, continuous and indivisible unit of the frame 100.

A height taken in the vertical direction of the second support protrusion 130b may not be greater than that of the display panel 10, as illustrated in FIG. 4B. Where the first support protrusion 130a faces and overlaps an entire of the lateral side surface of the display panel 10 in FIG. 2A, the second support protrusion 130b faces and overlaps only a portion of the lateral side surface of the display panel 10.

The second support protrusion 130b may have a height long enough to face and overlap a portion of the lateral side surface of the display panel 10 when the frame 100 accommodates the light guide plate 30 and the reflection sheet 50 therein.

Referring to FIGS. 2B and 5A, the third seating portion 120c is disposed continuous with and extended from an end of the third sidewall 110c of the frame. In one exemplary embodiment, the third seating portion 120c may be formed by bending one end of at least one of the sidewalls, e.g., the third sidewall 110c. The third seating portion 120c may extend from the third sidewall 110c to be bent to an interior side of (e.g., inwardly from) the third sidewall 110c. The third seating portion 120c may longitudinally extend substantially in parallel with a lateral side surface of the light guide plate 30 disposed facing the third sidewall 110c.

The third seating portion 120c may extend to the interior side of the frame 100 from the third sidewall 110c, and may be disposed substantially in parallel with the bottom surface 140 of the frame 100, so that the light source 40 is disposed between the third seating portion 120c and the bottom surface 140. The third seating portion 120c is integrally formed with the bottom surface 140 and the third sidewall 110c, serving as a light source cover to enclose the light source 40 in conjunction with the light guide plate 30.

The third seating portion 120c may be disposed to partially overlap the light guide plate 30, such as the light emitting surface of the light guide plate 30. As portions of the third seating portion 120c and the light guide plate 30 are overlapped with each other, leakage of the light emitted from the light source 40 can be reduced or effectively prevented.

The reflection sheet 50 is disposed is disposed below the light guide plate 30, and one end of the reflection sheet 50 may extend to surround the outer portion of the light source 40. As discussed above, the reflection sheet 50 is a single, unitary, indivisible and continuous member, The reflection sheet 50 may be arranged to extend sequentially from overlapping the bottom surface 140, overlapping the third sidewall 110c to overlapping the third seating portion 120c. The reflection sheet 50 concentrates the light from the light source 40 into the light guide plate 30.

Since the third seating portion 120c is spaced apart from the light source 40 by a predetermined distance, transmission of heat generated from the light source 40 to the display panel can be reduced or effectively prevented. Since the air layer is relatively low in heat transmitivity, direct transmission of the heat from the light source 40 by a space between the light source 40 and the display panel 10 can be reduced or effectively prevented. Advantageously, the effect of reducing the temperature of the display panel 10 can be exerted in the illustrated exemplary embodiment.

A width of the third seating portion 120c may be greater than a width of the first seating portion 120a or the second seating portion 120b. The widths are taken in the plan view of the display device 1 in the horizontal direction, such as from the respective sidewall 110c, 110a and 110b. The larger width of the third seating portion 120c may be determined according to the arrangement of the light source 40 being adjacent to the third sidewall 110c, where the first sidewall 110a and the second sidewall 110b are not arranged adjacent to the light source 40.

Referring to FIGS. 2B, 5A and 5B, the third support protrusion 130c is disposed continuous with and extended from an end of the third seating portion 120c, such as being extended from a top surface of the third seating portion 120c. The third support protrusion 130c supports a lateral side surface of the display panel 10 to reduce or effectively prevent movement of the display panel 10 in the frame 100. The third support protrusion 130c includes a first (vertical) portion overlapping the lateral side surface of the display panel 10, and a second (horizontal) portion overlapping the third seating portion 120c. The third support protrusion 130c may include a (distal) end disposed overlapping the third seating portion 120c. The third support protrusion 130c is extended outwardly towards the exterior side of the frame 100, and may have a substantially L-shaped cross section.

An electric wire 170 electrically and physically connected to the light source 40 may be provided in a space produced between the third support protrusion 130c and the third seating portion 120c. The distal end of the third seating portion 130c and disposed separated from the third seating portion 120c provides access to the space between the third support protrusion 130c and the third seating portion 120c from an exterior of the frame 100.

The third support protrusion 130c may be integrally disposed with the third sidewall 110c and the third seating portion 120c, and may be formed by bending at least one of the third sidewall 110c and the third seating portion 120c. As illustrated in FIGS. 2B, 5A and 5B, the third support protrusion 130c, the third seating portion 120c, the third sidewall 110c, and the bottom surface 140 collectively form a portion of a single, unitary, indivisible, continuous and indivisible unit of the frame 100.

A height taken in the vertical direction of the third support protrusion 130c relative to the third seating portion 120c, may be smaller than a thickness of the display panel 10 taken in the vertical direction. The height of the third support protrusion 130c may be determined in consideration of a diameter of the electric wire 170 interposed between the third support protrusion 130c and the third seating portion 120c. The third support protrusion 130c may be disposed at intervals along a longitudinal direction of the third seating portion 120c to then be spaced apart by a predetermined distance from each other. The second portion of the third support protrusion 130c may be disposed substantially parallel with the third seating portion 120c.

Referring to FIGS. 5B and 6, a fixing clip 150 for securely fixing the electric wire 170 connected to the light source 40 may be provided on the top surface of the seating portions 120a, 120b, 120c and/or 120d.

The fixing clip 150 securely fixes the electric wire 170 disposed under a lower face of the third support protrusion 130c and between the third support protrusion 130c and the third seating portion 120c. As shown in FIG. 5B, portions of the electric wire 170 may be extended along and connected to both sides of the third seating portion 120c along a longitudinal direction of the third seating portion 120c, to then both portion may be drawn out to the exterior side of the frame 100 through the fixing clip 150.

In an exemplary embodiment, the fixing clip 150 may be formed as two annular-shaped elastic protrusions. The portions of the electric wire 170 may be fixed by inserting the electric wire 170 into or between the two protrusions. The fixing clip 150 may be integrally formed with the third seating portion 120c and the third sidewall 110c, and may be formed by bending at least one of the third seating portion 120c and the third sidewall 110c. As illustrated in FIGS. 5B and 6, fixing clip 150, the third support protrusion 130c, the third seating portion 120c, the third sidewall 110c, and the bottom surface 140 collectively form a portion of a single, unitary, continuous and indivisible unit of the frame 100.

The fixing clip 150 may be disposed on various locations of the frame 100 according to the position where the electric wire 170 is drawn out to the exterior side of the frame 100 through the fixing clip 150. In one exemplary embodiment, in a case where the electric wire 170 is drawn out to a lower portion of the frame 100 (e.g., adjacent to the lower face of the third support protrusion 130c), the fixing clip 150 may extend towards the bottom surface 140. Alternatively, in a case where the electric wire 170 is drawn out toward the second sidewall 110b or the fourth sidewall 110d, the fixing clip 150 may be disposed on or extended from the second seating portion 120b or the fourth seating portion 120d.

Referring back to FIG. 5A, the fourth seating portion 120d is disposed continuous with and extended from an end of the fourth sidewall 110d of the frame 100. In one exemplary embodiment, the fourth seating portion 120d may be formed by bending one end of the fourth sidewall 110d. The fourth seating portion 120d may extend from the fourth sidewall 110d to be bent to an exterior side of (e.g., outwardly from) the fourth sidewall 110d. A fourth support protrusion 130d may be disposed continuous with and extended from an end of the fourth seating portion 120d. The structure of the frame 100 at sides of the rectangular shape adjacent to both a first side including the light source 40 disposed adjacent thereto and to a second side opposing the first side with respect to the light guide plate 30, are substantially similar. The fourth seating portion 120d, the fourth sidewall 110d and the fourth support protrusion 130d may be disposed to be symmetrical with respect to the second seating portion 120b, the second sidewall 110b and the second support protrusion 130b, and a detailed description thereabout will not be given.

Referring to FIGS. 3, 7A and 7B, a sheet fixing portion 160 may be disposed on at least one of the second seating portion 120b and the second sidewall 110b. The sheet fixing portion 160 may be disposed on a seating portion and/or a sidewall except for those where the light source 40 is disposed adjacent thereto, or a seating portion and/or sidewall opposing the light source 40 of the frame 100.

The sheet fixing portion 160 is provided in the form of a protrusion. The sheet fixing portion 160 fixes an extension 21 extending from a side of the optical sheet 20. The extension 21 of the optical sheet 20 includes a cutout portion 22 into which the sheet fixing portion 160 is inserted. The sheet fixing portion 160 may extend completely through the cutout portion 22, such that a distal end of the sheet fixing portion 160 is disposed further from the bottom surface 140 of the frame 100 than an upper surface of the optical sheet 20. When the optical sheet 20 is engaged with the sheet fixing portion 160 of the frame 100, the optical sheet 20 is disposed closer to the bottom surface 140 of the frame 100 than any of the seating portions 120a, 120b, 120c or 120d.

The sheet fixing portion 160 may be integrally formed with the bottom surface 140, the second seating portion 120b and/or the second sidewall 110b, such as being disposed continuous with the bottom surface 140, the second seating portion 120b and/or the second sidewall 110b. In one exemplary embodiment, the sheet fixing portion 160 may be formed by bending at least one of the second seating portion 120b and the second sidewall 110b. The sheet fixing portion 160 may be formed by cutting a portion of the second sidewall 110b, as shown in FIG. 7B. Alternatively, the sheet fixing portion 160 may be formed so as not to protrude over the second seating portion 120b.

The sheet fixing portion 160 may be disposed and formed to be symmetrical with respect to the second sidewall 110b and the fourth sidewall 110d, respectively, relative to the light guide plate 30. However, the location of the sheet fixing portion 160 is not limited to the illustrated exemplary embodiment, but the sheet fixing portion 160 may be disposed on various locations, such as on at least one of the first to fourth sidewalls 110a, 110b, 110c and 110d.

The frame 100 of the illustrated exemplary embodiment both supports the display panel 10 and functions as a receiving container forming the external appearance of the display device 1. Upper surfaces of the supporting protrusions 130a and 130c may be considered as defining an uppermost surface of the frame 100. Since all of the components of the display device 1 are completely disposed between the bottom surface 140 of the frame 100 and the uppermost surface of the frame 100, a volume of the frame 100 is reduced while the frame 100 dually serves as a frame and a receiving container of the edge illumination type display device 1. Advantageously, an overall thickness and/or weight of the display device 1 is reduced.

Figure 8:
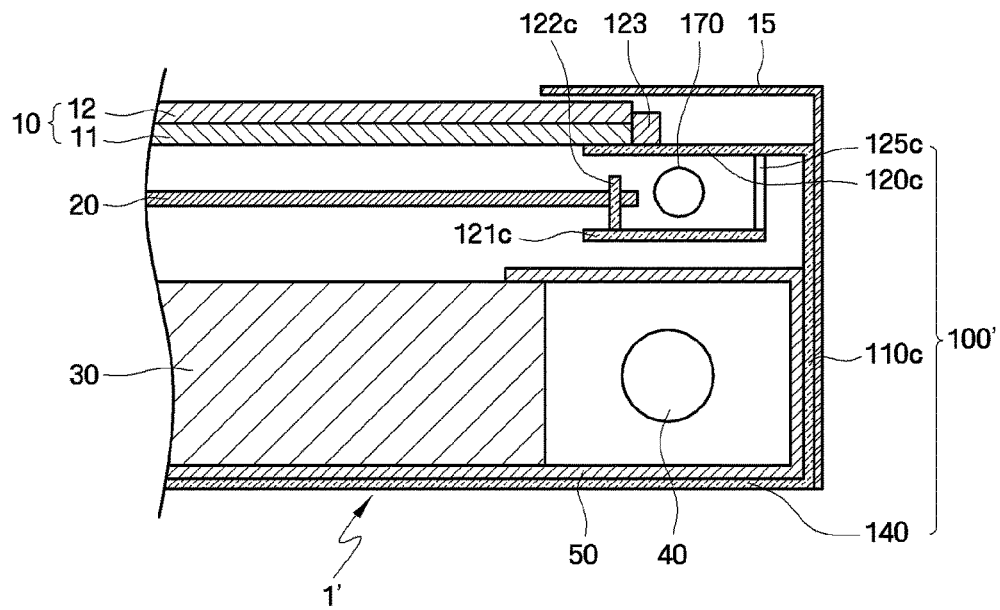
FIG. 8 is an exploded perspective view of a second exemplary embodiment of a display device according to the present invention.
Figure 9:
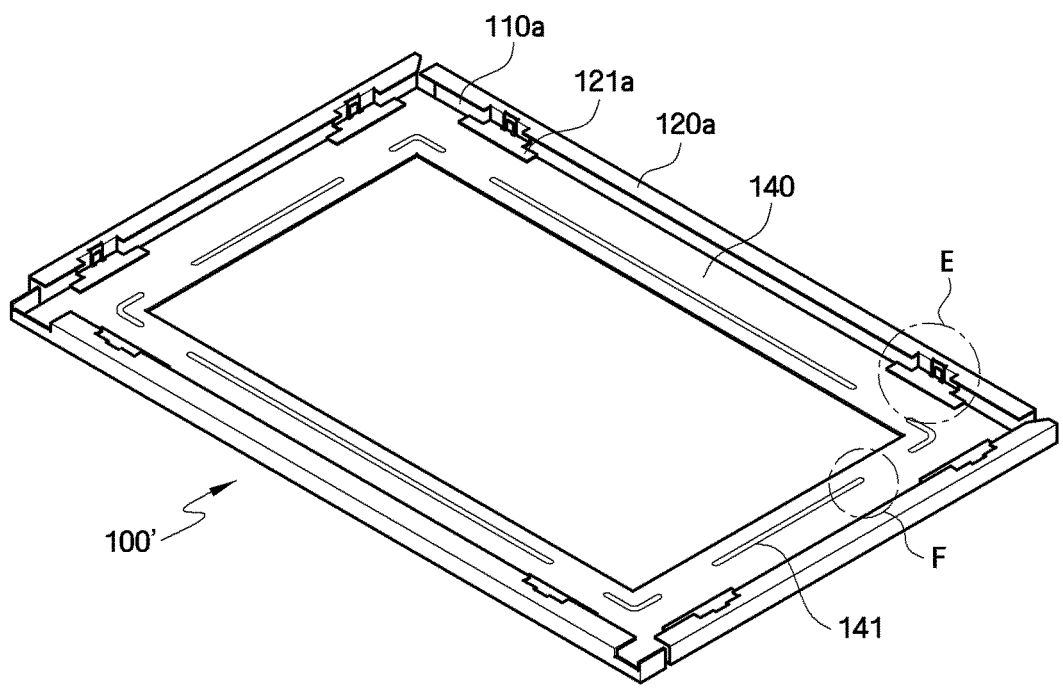
FIG. 9 is a perspective view of an exemplary embodiment of a frame included in the display device shown in FIG. 8.
Figure 10:
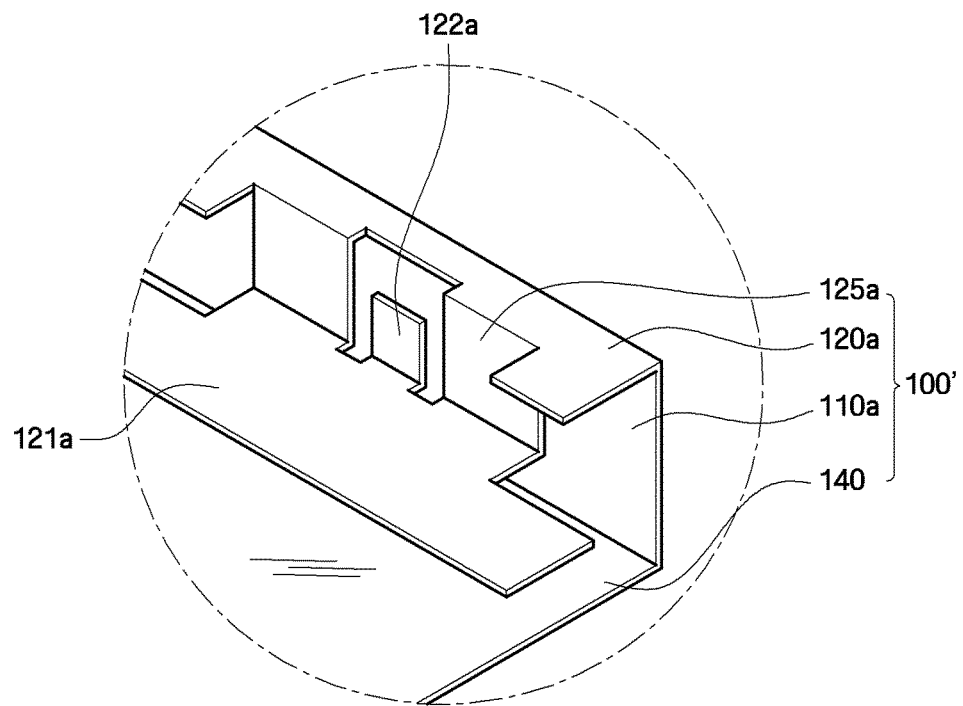
FIG. 10 is an enlarged view of a portion "E" of the frame shown in FIG. 9.
Figure 11:
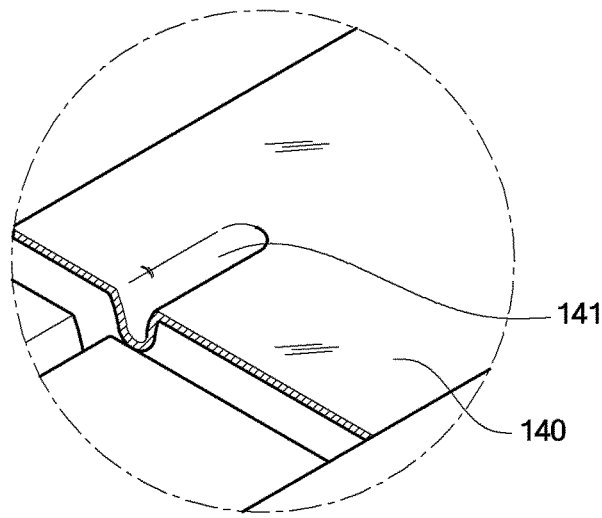
FIG. 11 is an enlarged view of a portion "F" of the frame shown in FIG. 9.

Hereinafter, a second exemplary embodiment of a display device 1' according to the present invention will be described in detail with reference to FIGS. 8 through 11. FIG. 8 is an exploded perspective view of a second exemplary embodiment a display device according to the present invention, FIG. 9 is a perspective view of a frame included in the display device shown in FIG. 8, FIG. 10 is an enlarged view of a portion "E" of the frame shown in FIG. 9, and FIG. 11 is an enlarged view of a portion "F" of the frame shown in FIG. 9. For the sake of illustrative convenience, elements identical to those in the previous embodiment are indicated by identical reference numerals, and a description thereof will be omitted.

The display device 1' includes first and third planar portions 121a and 121c and a reinforcing groove 141. In the following embodiment, the display device 1' will be described with regard to one of first to fourth sidewalls and first to fourth seating portions by way of example, and it is to be understood that the same is true for the others.

Referring to FIGS. 8 and 9, the third seating portion 120c may be formed by bending one end of the third sidewall 110c. The third seating portion 120c may continuously extend from the third sidewall 110c, such as to be bent to the interior side of (e.g., inwardly from) the third sidewall 110c. The third seating portion 120c may longitudinally extend substantially in parallel with a lateral surface of (e.g., a light incident surface of) the light guide plate 30 and facing the third sidewall 110c.

A third planar portion 121c is disposed between the third seating portion 120c and the bottom surface 140, so that an optical sheet 20 is seated thereon. In an exemplary embodiment, the third planar portion 121c may be integrally formed with, such as to be continuous with, the third seating portion 120c, and may be formed by bending the third seating portion 120c. The third planar portion 121c may be disposed in parallel with the third seating portion 120c and the bottom surface 140 of frame 100'.

The third planar portion 121c may be disposed at intervals (e.g., sectioned) along a longitudinal direction of the third seating portion 120c to then be spaced apart from each other by a predetermined interval. However, the arrangement of the third planar portion 121c is not limited to the illustrated exemplary embodiment, and the dimension, i.e., the length or the interval between sectioned parts of the third planar portion 121c if the third planar portion 121c is sectioned, may vary according to the size of the frame 100 or the optical sheet 20. Alternatively, the third seating portion 120c may be arranged sequentially from the bottom surface 140, the third sidewall 110c to the third seating portion 120c.

The third planar portion 121c may be disposed continuous with and connected to the third seating portion 120c by a third connecting portion 125c. In one exemplary embodiment, the third planar portion 121c may be formed by bending the third seating portion 120c in cooperation with the third connecting portion 125c. Referring to FIG. 8, the third planar portion 121c may essentially be suspended under the third seating portion 120c, and between the third seating portion 120c and the bottom surface 140 of the frame 100'.

A third sheet fixing portion 122c is disposed on and continuous with the third planar portion 121c. The third sheet fixing portion 122c is inserted into a cutout portion 22 of an optical sheet 20 and securely fixes the optical sheet 20 in the frame 100'. In one exemplary embodiment, the third sheet fixing portion 122c may be formed by bending at least one of the third planar portion 120c and the third connecting portion 125c.

Referring to FIG. 8, an electric wire 170 connected to a light source 40 may be provided in a space produced between the third planar portion 121c and the third seating portion 120c. In the second exemplary embodiment, the third connecting portion 125c and the third planar portion 121c extending from the third seating portion 120c are completely disposed between the third seating portion 120c and the bottom surface 140 of the frame 100' to define the space in which the electric wire 170 is disposed. In contrast, the first exemplary embodiment includes the third seating portion 120c is completely disposed between the third support protrusion 130c and the bottom surface 140 of the frame 100' to define the space in which the electric wire 170 is disposed, as illustrated in FIG. 2B.

Meanwhile, third support protrusions 123 may be disposed on the third seating portion 120c. The third support protrusions 123 may be integrally formed with the third planar portion 121c, and may be made of a flexible material, such as rubber. The third support protrusions 123, the third seating portion 120c, the third connecting portion 125c, the third planar portion 121c, the third sheet fixing portion 122c, the third sidewall 110c and the bottom surface 140 collectively form a portion of a single, unitary, continuous and indivisible unit of the frame 100'. The third support protrusion 123 (FIG. 8) and the third support protrusion 130c (FIG. 2B) are each disposed facing a lateral side surface of the display panel 10.

Referring to FIGS. 9 and 10, a first sheet fixing portion 122a and a first connecting portion 125a may be disposed on a same surface, such as being on a same plane with each other and/or both extended from a lower surface of the first seating portion 120a. Advantageously, a factor causing a dark area to a display panel 10 between the first seating portion 120a and the first planar portion 121a can be reduced or effectively eliminated, thereby suppressing occurrence of the dark area on the display panel 10. Referring to FIG. 10, the first planar portion 121a may essentially be suspended under the first seating portion 120a, and between the first seating portion 120a and the bottom surface 140 of the frame 100'. Where the first and third seating portions 120a and 120c are both extended inwardly from the first and third sidewall portions 110a and 110c, respectively, in the second exemplary embodiment illustrated in FIGS. 8-10, the first seating portion 120a is extended outwardly from the first sidewall 110a and third seating portion 120c is extended inwardly from the third sidewall 110c in the first exemplary embodiment illustrated in FIGS. 1-5B. In a plan view of the frame 100, the first and third seating portions 120a and 120c are both extended on a same direction, while in a plan view of the frame 100' the first and third seating portions 120a and 120c are extended in different directions.

Referring to FIGS. 9 and 11, a plurality of the reinforcing groove (e.g., slot) 141 are disposed on the bottom surface 140 of the frame 100'. The reinforcing slots 141 reinforce the overall strength of the frame 100'. The reinforcing slots 141 are shaped of furrows disposed longitudinally extended in parallel with the first to fourth sidewalls 110a, 110b, 110c and 110d, respectively. The reinforcing slots 141 may also be disposed at corners of the frame 100' to extend substantially parallel with adjacent sidewalls 110a, 110b, 110c and 110d, respectively. The reinforcing slots 141 may also be continuous while being disposed parallel to both of adjacent sidewalls 110a, 110b, 110c and 110d, respectively. The reinforcing slots 141 protrude from a lower surface of the bottom surface 140 of the frame 100' towards an exterior of the frame and a rear of the display device 1'. In one exemplary embodiment, the reinforcing slots 141 may be formed by pressing the bottom surface 140.

The frame 100' of the illustrated exemplary embodiment both supports the display panel 10 and functions as a receiving container forming the external appearance of the display device 1'. Upper surfaces of the supporting protrusions 123 may be considered as defining an uppermost surface of the frame 100'. Since the electric wire 170 of the display device 1' is completely disposed between the bottom surface 140 of the frame 100' and the uppermost surface of the frame 100', a volume of the frame 100' is reduced while the frame 100' dually serves as a frame and a receiving container of the edge illumination type display device 1'. Advantageously, an overall thickness and/or weight of the display device 1' is reduced.

Additionally, since the reinforcing slots 141 are protruded outwardly from the bottom surface 140 of the frame 100', the overall thickness of the display device 1' is not increased. Moreover, since the first sheet fixing portion 122a and the first connecting portion 125a may be disposed on a same surface, a dark area to a display panel 10 between the first seating portion 120a and the first planar portion 121a can be reduced or effectively eliminated, thereby advantageously suppressing occurrence of the dark area on the display panel 10.

Figure 12:
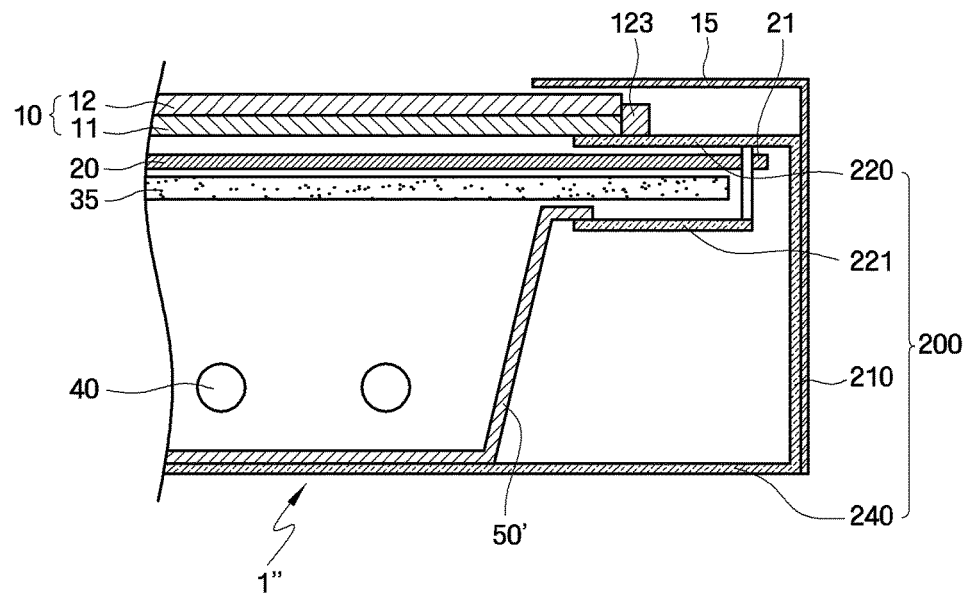
FIG. 12 is an exploded perspective view of a third exemplary embodiment of a display device according to the present invention.
Figure 13:
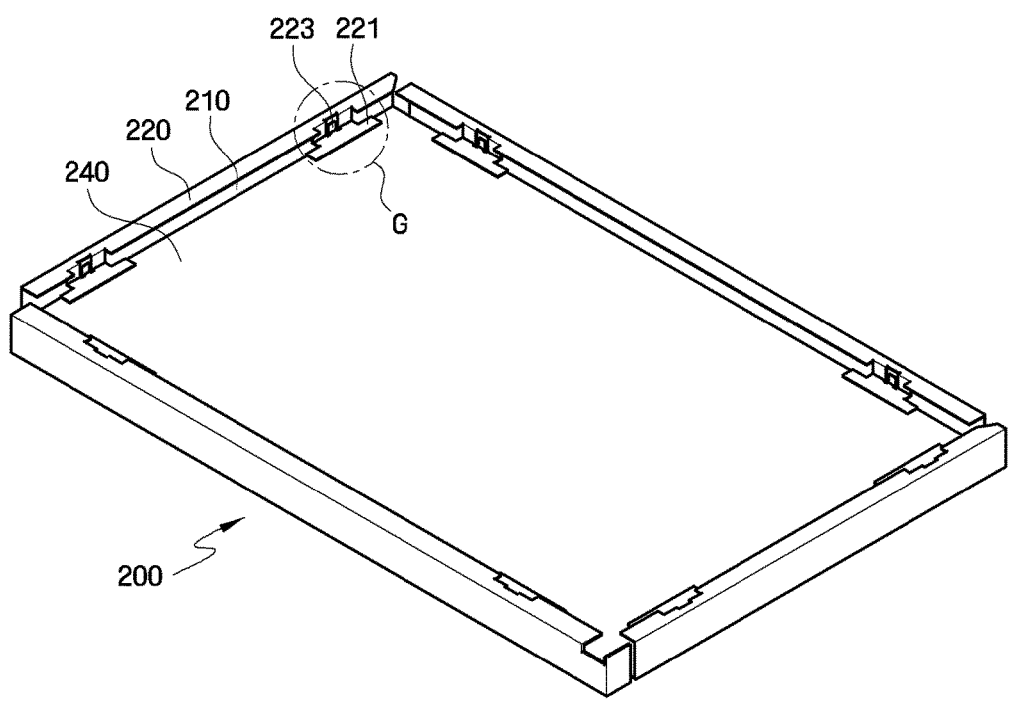
FIG. 13 is a perspective view of an exemplary embodiment of a frame included in the display device shown in FIG. 12.
Figure 14:
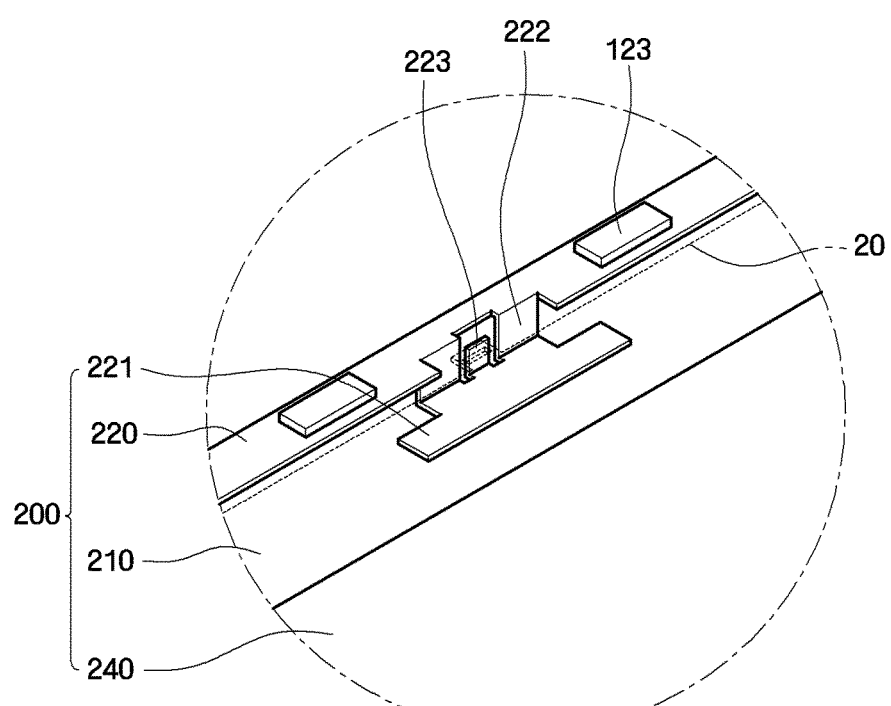
FIG. 14 is an enlarged view of a portion "G" of the frame shown in FIG. 13.

Hereinafter, a third exemplary embodiment of a display device 1" according to the present invention will be described in detail with reference to FIGS. 12 through 14. FIG. 12 is an exploded perspective view of a third exemplary embodiment a display device according to the present invention, FIG. 13 is a perspective view of a frame included in the display device shown in FIG. 12, and FIG. 14 is an enlarged view of a portion "G" of the frame shown in FIG. 13. For the sake of illustrative convenience, elements identical to those in the previous embodiment are indicated by identical reference numerals, and a description thereof will be omitted.

The display device 1" includes an optical sheet 20 and a diffusion sheet 35 seated on a planar portion 221 of a frame 200, and a light source 40 disposed below the diffusion sheet 35.

A seating portion 220 is disposed continuous with and extending from a sidewall 210. In one exemplary embodiment the seating portion 220 may be formed by bending one end of the sidewall 210. The seating portion 220 may continuously extend from the sidewall 210 to then be bent to an interior side of the sidewall 210, such as inwardly relative to the sidewall 210.

A planar portion 221 is disposed between the seating portion 220 and a bottom surface 240 of the frame 200, and the optical sheet 20 and the diffusion sheet 35 are seated on the planar portion 221. The planar portion 221 may be integrally formed with the seating portion 220, such as to be continuous with the seating portion 220. In one exemplary embodiment, the planar portion 221 may be formed by bending a portion of the seating portion 220. The planar portion 221 may be disposed substantially in parallel with the seating portion 220. A plurality of the planar portion 221 may be disposed at intervals along a longitudinal direction of the seating portion 220 to then be spaced apart by a predetermined distance from each other.

The planar portion 221 may be continuous with and connected to the seating portion 220 by a connecting portion 222. In one exemplary embodiment, the planar portion 221 may be formed by bending the seating portion 220 in cooperation with the connecting portion 222.

A sheet fixing portion 223 is disposed on the planar portion 221. The sheet fixing portion 223 is inserted into a cutout portion 22 of an optical sheet 20 and securely fixes the optical sheet 20. The sheet fixing portion 223 may be formed by bending at least one of the planar portion 221 and the connecting portion 222.

The sheet fixing portion 223 is provided in the form of a protrusion extending from and continuous with the planar portion 221. The sheet fixing portion 223 fixes an extension 21 extending from a side of the optical sheet 20. The extension 21 of the optical sheet 20 includes a cutout portion 22 into which the sheet fixing portion 223 of the frame 200 is inserted.

The sheet fixing portion 223 and the connecting portion 222 may be disposed on the same surface, such as being on a same plane with each other and/or both extended from an upper surface of the planar portion 221. Advantageously, a factor causing a dark area to a display panel 10 between the seating portion 220 and the planar portion 221 can be reduced or effectively eliminated, thereby suppressing occurrence of the dark area on the display panel 10.

Ends (e.g., edges) of the optical sheet 20, the diffusion sheet 35 and the reflection sheet 50' are each inserted into a space between the planar portion 221 and the seating portion 220.

The light source 40 is disposed directly below the display panel 10 to completely overlap the display panel 10. By "the light source 40 being disposed directly below the display panel 10," it should be understood that the light source 40 is disposed directly below the display panel 10 to then be disposed to overlap a top surface (e.g., viewing surface or display area) of the display panel 10. The light source 40 is configured to make the light generated and emitted from the light source 40 directly incident into the display panel 10 without passing through a separate light path changing means, e.g., a light guide plate, for changing horizontally incident light into vertically traveling light. Accordingly, the light from the light source 40 is emitted in a direction substantially perpendicular to the surface of the display panel 10, and then supplied to the display panel 10 via the diffusion sheet 35 and the optical sheet 20. Such a configuration may also be referred to as a direct-type backlight assembly, in contrast to those exemplary embodiments of FIGS. 1-11.

The frame 200 of the illustrated exemplary embodiment both supports the display panel 10 and functions as a receiving container forming the external appearance of the display device 1". Upper surfaces of the supporting protrusions 123 may be considered as defining an uppermost surface of the frame 200. Since the optical sheet 20 and the diffusion sheet 35 of the display device 1" are completely disposed between the bottom surface 240 of the frame 200 and the uppermost surface of the frame 200, a volume of the frame 200 is reduced while the frame 200 dually serves as a frame and a receiving container of the direct illumination type display device 1". Advantageously, an overall thickness and/or weight of the display device 1" is reduced.

While the present invention has been particularly shown and described with reference to exemplary embodiments thereof, it will be understood by those of ordinary skill in the art that various changes in form and details may be made therein without departing from the spirit and scope of the present invention as defined by the following claims. It is therefore desired that the present embodiments be considered in all respects as illustrative and not restrictive, reference being made to the appended claims rather than the foregoing description to indicate the scope of the invention.

What is claimed is:

1. A display device comprising:
a display panel displaying images;
a light source generating and supplying light to the display panel; and
a unitary indivisible frame supporting the display panel and including the light source disposed therein, the frame including:
a bottom surface,
a plurality of sidewalls which each extend from the bottom surface,
a plurality of seating portions which each extend from a respective sidewall of the plurality of sidewalls, and on which the display panel is disposed; and
a plurality of support protrusions protruding from the seating portions and facing a lateral side surface of the display panel,
wherein
the bottom surface, the plurality of sidewalls, the plurality of seating portions and the plurality of support protrusions are disposed continuous with each other in the unitary indivisible frame,
a first seating portion extends directly from the respective sidewall and towards an exterior side of the frame, and
a first support protrusion includes a first portion overlapping the lateral side surface of the display panel and a second portion overlapping an upper surface of the display panel at outer edges of the display panel.

2. The display device of claim 1, wherein at least one of the support protrusions is disposed overlapping a seating portion.

3. The display device of claim 2, wherein an electric wire electrically connected to the light source is provided between the support protrusion and the seating portion.

4. The display device of claim l, wherein the plurality of support protrusions is arranged separated from each other along a longitudinal direction of a respective seating portion.

5. The display device of claim l, wherein the display panel and the light source are disposed completely between a plane of an uppermost surface of the support protrusions and the bottom surface of the frame.

6. The display device of claim 1, wherein the seating portions overlap a portion of a lower surface of the display panel.

7. The display device of claim 1,
further comprising an optical sheet interposed between the display panel and the frame and including a cutout portion disposed at an end of the optical sheet; and
wherein the frame further includes a sheet fixing portion continuously extended from at least one of the seating portions and the sidewalls, the sheet fixing portion of the frame being inserted into the cutout portion of the optical sheet when the optical sheet is interposed between the display panel and the frame.

8. The display device of claim 1, wherein the frame further includes a planar portion continuously extended from at least one of the seating portions, and disposed between the seating portion and the bottom surface of the frame.

9. The display device of claim 8, wherein the planar portion is disposed opposing the support protrusions with respect to the seating portions.

10. The display device of claim 8, further comprising an optical sheet disposed between the seating portions and the planar portion, and the at least one of the seating portions overlap the support protrusion.

11. The display device of claim 8,
further comprising an optical sheet disposed between the seating portions and the planar portion, and including a cutout portion disposed at an end of the optical sheet; and
wherein the frame further includes a sheet fixing portion continuously extended from the planar portion, and inserted into the cutout portion when the optical sheet is disposed between the seating portions and the planar portion.

12. The display device of claim 11, wherein the frame further includes a connecting portion disposed continuous with and connecting the seating portion and the planar portion.

13. The display device of claim 12, wherein the planar portion is disposed substantially parallel to the seating portion, and disposed separated from the seating portion by the connecting portion.

14. The display device of claim 1, further comprising a coupling member which adhesively couples at least one of the seating portions and the sidewalls, to the display panel.

15. The display device of claim 1,
wherein the frame further includes a fixing clip continuously extended from a sidewall, and
wherein an electric wire electrically connected to the light source and provided on a seating portion extended from the sidewall, is inserted into the fixing clip to be fixed to the frame.

16. The display device of claim 1, wherein the frame further includes reinforcing slots disposed on the bottom surface and longitudinally extended substantially in parallel with the sidewalls of the frame.

17. The display device of claim 1, wherein at least one of the seating portions extends towards an interior side of the frame, such that the light source is disposed between the seating portion and the bottom surface.

18. The display device of claim 1, wherein the light source is disposed directly below the display panel to overlap a display area of the display panel.

19. The display device of claim 18, further comprising a reflection sheet disposed between the light source and the bottom surface, wherein an end of the reflection sheet overlaps the seating portion.

20. A backlight assembly comprising:
- a light source generating and supplying light; and
- a unitary indivisible frame including the light source disposed therein, the frame including:
  - a bottom surface,
  - a plurality of sidewalls which each extend from the bottom surface,
  - a plurality of seating portions which each extend from a respective sidewall, and on which a display panel is disposed; and
  - a plurality of support protrusions protruding from the seating portions and facing a lateral side surface of the display panel,
  - wherein
  - the bottom surface, the plurality of sidewalls and the plurality of seating portions are disposed continuous with each other in the unitary indivisible frame,
  - a first seating portion extends directly from the respective sidewall and towards an exterior side of the frame, and
  - a first support protrusion includes a first portion overlapping the lateral side surface of the display panel and a second portion overlapping an upper surface of the display panel at outer edges of the display panel.

21. The backlight assembly of claim 20, wherein the frame further includes a planar portion extended from at least one of the seating portions, and disposed between the seating portions and the bottom surface.

\* \* \* \* \*